UNITED STATES PATENT OFFICE.

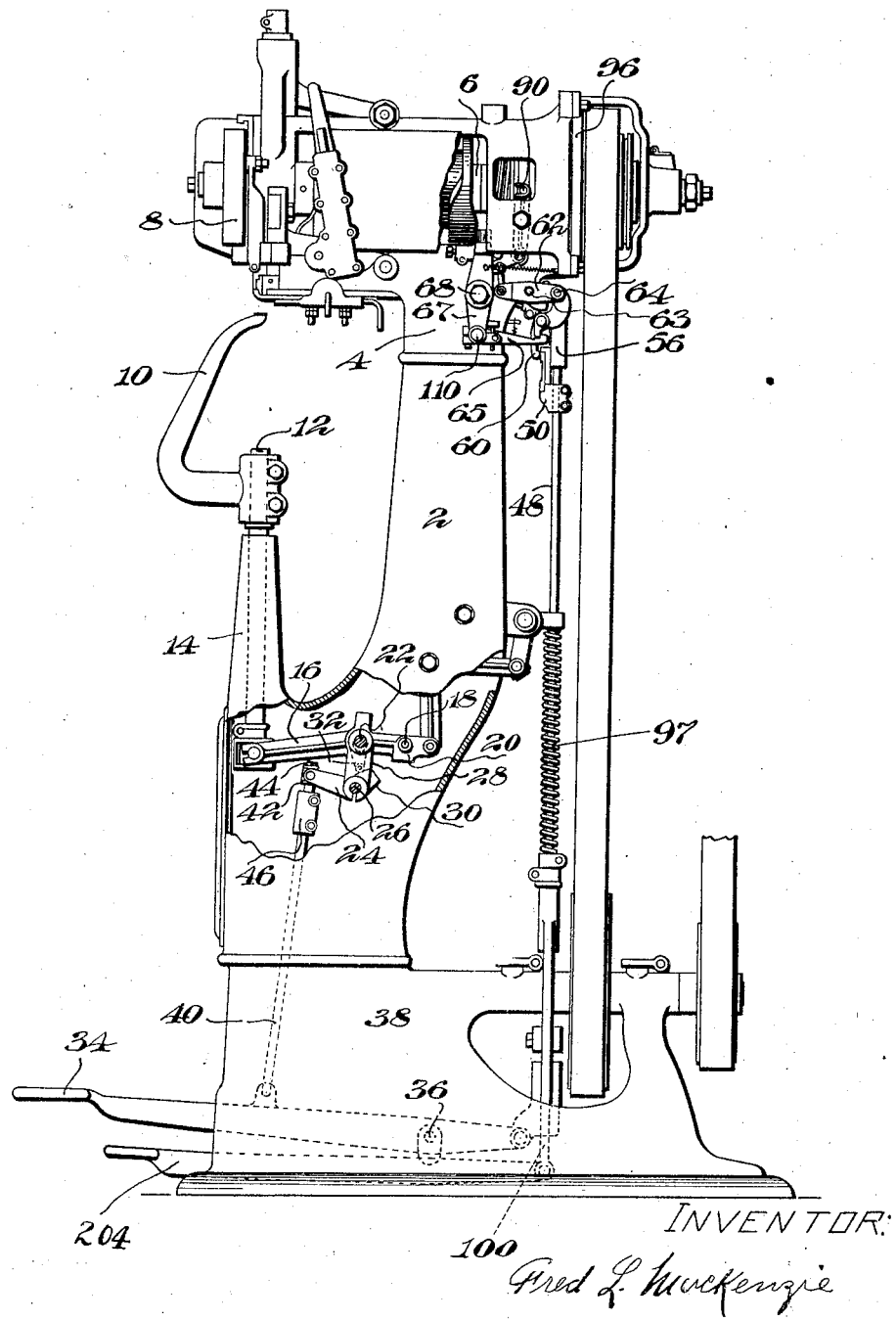

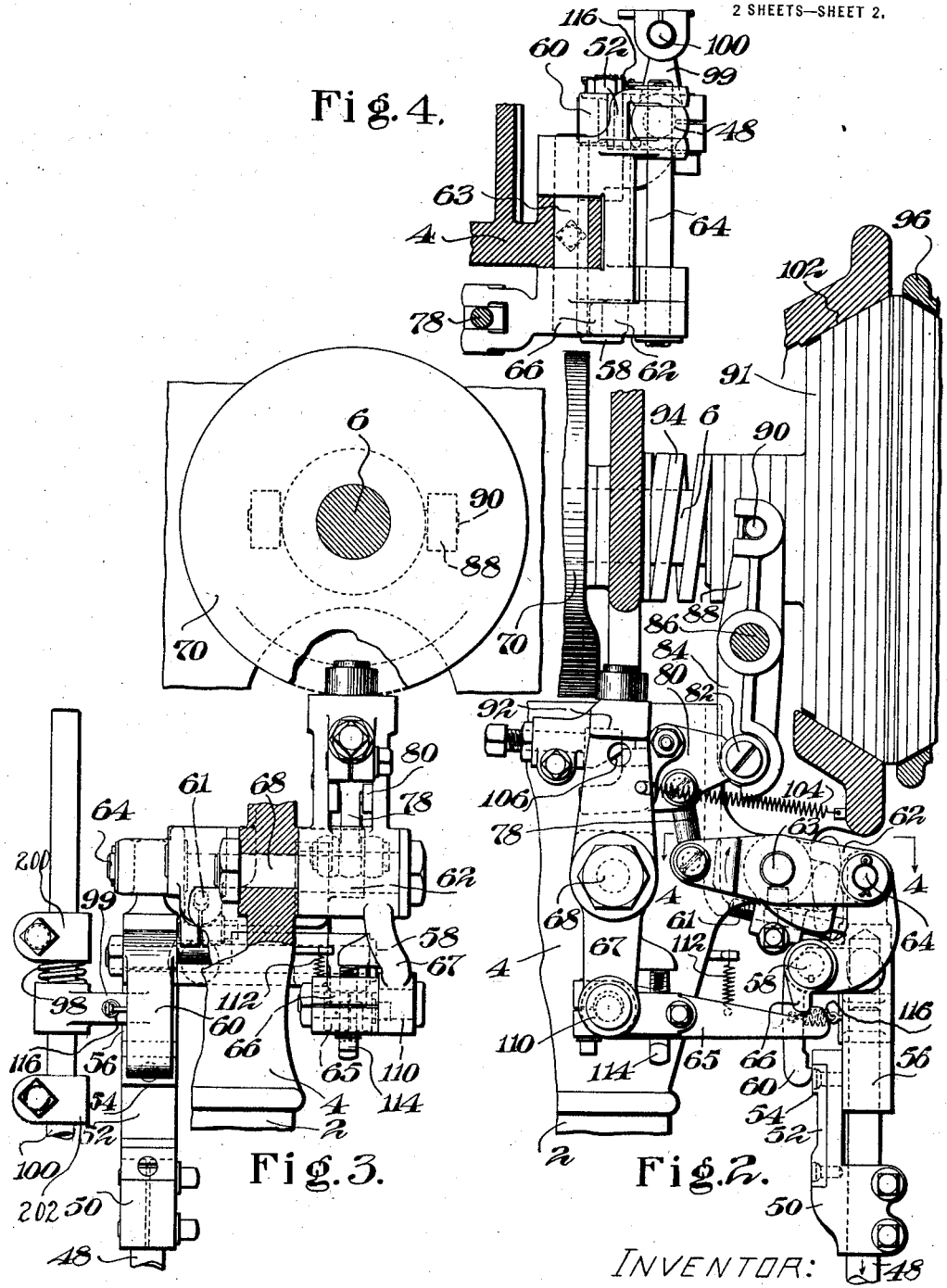

FRED L. MACKENZIE, OF BEVERLY, MASSACHUSETTS, ASSIGNOR TO UNITED SHOE MACHINERY CORPORATION, OF PATERSON, NEW JERSEY, A CORPORATION OF NEW JERSEY.

FASTENING-INSERTING MACHINE.

1,389,205.  Specification of Letters Patent.  Patented Aug. 30, 1921.

Application filed October 10, 1918. Serial No. 257,592.

*To all whom it may concern:*

Be it known that I, FRED L. MACKENZIE, a citizen of the United States, residing at Beverly, in the county of Essex and State of Massachusetts, have invented certain Improvements in Fastening - Inserting Machines, of which the following description, in connection with the accompanying drawings, is a specification, like reference characters on the drawings indicating like parts in the several figures.

This invention relates to fastening inserting machines such, for example, as are employed in the manufacture of shoes and has for its object to improve the mechanism by which such machines are controlled.

The invention is particularly designed for use with fastening inserting machines of the kind in which the instrumentalities for inserting the fastenings are controlled as to the initiation and suspension of their operation by clutch mechanism. The work in which the fastenings are to be inserted is commonly mounted upon a work support, and means is provided for lowering the work support to facilitate the placing of the work thereon and for elevating the support to present the work supported by it in proper relation to be operated on by the fastening inserting instrumentalities.

Fastening inserting machines have heretofore been constructed in which the controlling means for the machine has comprised connections between the work support controlling means and the clutch mechanism so that the work support is raised or lowered when the clutch is thrown in or out to start or stop the machine. In such machines, however, the clutch mechanism is of a type in which the movable clutch member is moved into and out of clutching relation under the direct control of the operator, such member being moved into clutching relation by force exerted by the operator and out of clutching relation by a spring. It has, however, been found to be advantageous in fastening inserting machines of certain types, for instance, machines for inserting previously formed fastenings, such as "loose nails" to employ clutch mechanism in which the movable clutch member is actuated by power-operated means in a direction away from the constantly operated element of the clutch and into engagement with a braking surface so as to stop the machine more quickly and with greater certainty than when the clutch member is moved out of clutching engagement by a spring or other impositive means. In clutch mechanism of this character, clutch controlling means is provided operable to connect the movable clutch member to the power-operated means or to disconnect it therefrom. The clutch controlling means is under the control of the operator and when it is moved to a position to connect the clutch member operatively with the power-operated means, said member is moved out of clutching engagement at a predetermined point in the cycle of operations of the machine dependent upon when the power-operated means is actuated.

Manifestly, it is not practicable to connect the work support controlling means to the clutch controlling means of a clutch in which the movable clutch member is power operated in the same manner as when the movable clutch member is operated directly by its connections with the work support, inasmuch as in the former case, the movable clutch member will only accidentally be moved to stop the machine directly upon movement of the controlling means, the extent of the interval between the actuation of the clutch controlling means and the operation of the clutch member being determinate upon the time of operation of the power operated means following the actuation of the controlling means. Consequently, the work support might be lowered prematurely by reason of the work support controlling means and the clutch controlling means being moved at a point in the cycle of operations of the machine appreciably in advance of the point when the power-operated means is actuated to throw out the clutch and stop the machine.

One of the objects of the invention is so to connect the work support controlling means to the clutch mechanism as uniformly and certainly to prevent premature lowering of the work support when the machine is stopped, and yet to permit the work support to be lowered at the proper time. To his end an important feature of the invention consists in the provision of connections between the clutch mechanism and the work support and power-operated means for breaking said connections to permit lowering of the work support.

In accordance with a further feature of the invention, the movable clutch member is power-operated in a direction to throw out the clutch and the work support is retained in raised position by means which is rendered inoperative substantially simultaneously with the throwing out of the clutch so as to permit the work support to be lowered when the machine stops. Preferably, and in the illustrated construction the work support retaining means is rendered inoperative by the operating means for the movable clutch member. Controlling means for the work support is connected to means for controlling the operation of the movable clutch member by its operating means, such connections acting to retain the work support in raised position and being broken by means operated by the clutch member operating means when the clutch member is thrown out so that the work support is invariably lowered simultaneously with the stopping of the machine inasmuch as its descent is controlled by the same mechanism that stops the machine.

The invention in another aspect pertains to the work support controlling means without reference to its connection with the clutch mechanism. In such aspect, an important feature of the invention resides in the provision of means for limiting the movement of the work support raising and lowering mechanism which, while it permits movement of said mechanism to a certain degree for any desired purpose prevents lowering of the work support and means for throwing said limiting means out of operation at a predetermined time in the cycle of operations of the machine to allow the work support to be lowered.

The invention will be hereinafter described by way of example as applied to a machine of the type disclosed in the patent to Goddu, No. 1,030,775 for inserting previously formed fastenings, such as "loose nails." It is realized, however, that the invention is not restricted in its application to such machines only but may be used in other relations including embodiment in fastening inserting machines of other types, for instance, slugging machines. Moreover, the invention in certain of its aspects is not limited to a clutch mechanism of the character disclosed comprising power-operated means for operating the movable clutch member. The scope of the invention is accordingly to be restricted only as required by the appended claims.

Other objects and features of the invention will appear as the description proceeds and will be pointed out in the claims.

In the drawings,

Figure 1 is a view in side elevation of a fastening inserting machine embodying the invention;

Fig. 2 is an enlarged view of the clutch mechanism of the machine and the means for locking the work support controlling means to the clutch controlling means;

Fig. 3 is a view of the parts shown in Fig. 2 taken from the left, and

Fig. 4 is a view in cross section along the line 4—4 of Fig. 2 looking in the direction of the arrows.

The machine comprises a column 2 having a head 4 in which is journaled the main shaft 6 which carries cams for operating the various moving parts of the machine including the fastening inserting instrumentalities designated generally by 8 and carried on the front of the machine head 4.

The work is supported upon a horn 10 carried by a horn post 12 slidably mounted in the upstanding sleeved portion 14 at the front of the column 2. The horn post 12 is jointed at its lower end to a lever 16 pivoted at 18 to a forked lever 20 which, in turn, is pivoted at 22 in the column 2 of the machine. Movement of the lever 16 about its fulcrum point 18 consequently will occasion the raising or lowering of the horn 10 and the work carried thereby.

The controlling means for the work support comprises a lever 24 pivoted at 26 to the depending portions 28 of the forked lever 20 and said lever 24 is formed with a cam shaped end 30 constructed for engagement with a depending portion 32 of the lever 16. When, therefore, a turning movement is imparted to the lever 24 about its fulcrum 26, the horn post will be raised or lowered depending upon the direction of such movement. The lever 24 is operated from a treadle 34 pivoted at 36 in the base 38 of the machine and connected by means of a link 40 to the lever 24, the connection between the link 40 and the lever 24 being preferably of a character to permit lost motion. To this end, the lever 24 is provided with a block 42 through which passes the upper end of the link 40, and secured to the link 40 above and below the block 42, respectively, are the stop nut 44 and adjustable collar 46. The work support controlling mechanism hereinbefore described may be and, as shown, is substantially of the character of that fully illustrated and described in the patent to Goddu No. 1,011,941 to which reference may be made for a complete disclosure of parts not fully described herein.

The treadle 34 at its rear end is joined to a rod 48 which extends upwardly at the rear of the machine frame and is provided with a block 50 clamped to its upper end and having seated therein a plate 52 formed to present a shoulder 54. In accordance with an important feature of the invention, means is provided for engaging the shoulder 54 of the block 50 to maintain the work support in elevated position. As shown, such means comprises a movable sleeved member 56 having a laterally and inwardly extending portion in which is journaled a locking device comprising a shaft 58 and a pawl or latch member 60 depending therefrom and formed to engage the shoulder 54 of the block 50 to connect the work support controlling means with the movable member 56.

Movement of the member 56 and rod 48 downwardly when the treadle 34 is released would if continued far enough carry the cam shaped end of the lever 24 from beneath the projection 32 of the lever 16, thus causing the work support to be lowered. The downward movement of the member 56 and the rod 48 is, however, limited by the adjustable stop 61 carried by the lever 62 fulcrumed at 63 on the machine frame, said lever 62 having the member 56 pivoted thereto at 64. The stop 61 operates against the frame of the machine head 4 and is so adjusted as to check the downward movement of the member 56 before the lost motion between the lever 24 and collar 46 is taken up. The movement of the parts permitted by the stop 61 does not therefore cause the work support to be lowered.

In order that the work support may be lowered when the machine is stopped to facilitate the removal from the support of work in which fastenings have been inserted and the application of a fresh piece of work to the work support, I have provided means for breaking the connection between the work support controlling means and the member 56. Such means comprises a latch member 65 having an upturned end arranged for engagement with a shouldered member in the form of a lug 66 depending from the shaft 58 and rigidly connected with latch member 60, said latch member 65 being pivotally carried by a lever 67 fulcrumed at 68 on the head 4 of the machine and operated by a cam 70 on the main shaft 6. When the lower end of the lever 67 is moved inwardly by operation of the cam 70, the latch member 65 acting against the lug 66 withdraws the latch or pawl 60 from engagement with the shoulder 54 of the block 50, thus permitting the work support to be lowered.

To the end that the raising and lowering of the work support and the starting and stopping of the machine respectively may be concurrently effected, the clutch mechanism is interconnected with the work support controlling means in such a manner as to synchronize the operations of the clutch mechanism and work support. Accordingly, the clutch mechanism comprises a link 78 connected at one end to the lever 62 hereinbefore described and at its other end to a block 80 fulcrumed at 82 to a lever 84 in turn pivoted at 86 on the head 4 of the machine and formed at its upper end with forked members 88 provided with sockets to receive studs 90 extending from diametrically opposite sides of the clutch member 91. The lever 67 carries at its upper end a block 92 so arranged that movement of the block 80 by the link 78 carries the block 80 into or out of the path of movement of the block 92. When the treadle 34 is depressed and the rod 48 moved upwardly, the block 50 is thrust against the lower end of the sleeved member 56 and turns the block 80 downwardly about its fulcrum 82, out of engagement with the block 92 of the lever 67, thereby permitting the clutch member 91 to be moved under the impulse of the spring 94 mounted on the main shaft 6, into engagement with the constantly rotated pulley 96. When the operator removes his foot from the treadle 34, thus permitting the rod 48 to be lowered by the spring 97 which incloses the rod, the sleeved member 56 is moved downwardly by pressure exerted by a spring 98 coiled about a rod 100 at the rear of the machine, Figs. 3 and 4, and interposed between a block 200 on the rod and an arm 99 projecting laterally from the sleeve 56. The lever 62 is thereby turned about its fulcrum 63 to interpose the shoulder of the block 80 into the path of the block 92 of the lever 67 by operation of which the clutch member 91 is carried out of engagement with the pulley 96 and into contact with the brake 102 thus stopping the machine. The lever 67 is maintained normally to the right as shown in Fig. 2 by a spring 104 connected to the upper end of the lever and to the head 4. When, however, the sleeved member 56 is permitted to move downwardly under the impulse of the spring 98, such spring operates through the sleeved member, lever 62, link 78, and block 80 against the beveled surface 106 of the block 92 of the lever 67 with a force greater than that of the spring 104, thereby causing the roll on the upper end of the lever 67 to follow the surface of the cam 70. The rod 100 has a block 202 mounted thereon below the arm 99, and at its lower end said rod is connected to a treadle 204. Depression of the treadle 204 initiates the operation of the machine without elevating the work support.

The latch member 65 is adjustably connected by an eccentric pivot 110 to the lever 67 and is normally held upwardly by a spring 112 secured to the latch member and the head 4 of the machine to a point adjustably determined by the screw 114. The positioning of the latch member 65 by the stop screw 114 is such that the movement of the member 56 permitted by the stop 61 carries the lug 66 into operative relation with the latch member. If the roll on the lever 67 does not register with the most depressed portion of the cam 70 when the lug 66 moves downwardly, the lug will strike the end of the latch member 65 in advance of the shoulder on said member. In such a case, however, when the extreme depression of the cam 70 is brought into register with the lever 67, the spring 98, operating through the connections above described, will cause the upper end of the lever 67 to move into the recess of the cam, thus moving the latch 65 forwardly far enough to permit the lug 66 to engage the latch member rearwardly of the shoulder of said member. Upon continued rotation of the main shaft 6, the raised portion of the cam 70 will move the upper end of the lever 67 to the right Fig. 2, thereby throwing the clutch out of action to stop the machine and the lower end of the lever to the left, thus withdrawing the latch or pawl 60 from engagement with the shoulder 54 of the block 50 so that the rod 48 is permitted to move downwardly under the impulse of the spring 97 to lower the work support simultaneously with the throwing out of the clutch. Accordingly, although the operator may, by removing his foot from the treadle 34, initiate the lowering of the work support and the throwing in of the clutch at any time in the cycle of operations of the machine, such operations will be performed only at the predetermined time in such cycle of operations when the lever 67 is actuated by the cam 70. When, on the other hand, the operator presses down on the treadle, he simultaneously raises the work support and withdraws the block 80 from engagement with the block 92 so that the clutch is immediately engaged to start the machine.

Having fully described my invention, what I desire to secure by Letters Patent of the United States is:—

1. In a machine of the class described, in combination, clutch mechanism, a work support, connections between the clutch mechanism and the work support operable to maintain the work support in raised position, and power-operated means for breaking said connections to permit lowering of the work support.

2. In a machine of the class described, in combination, a clutch comprising a movable clutch member, power-operated means for positively moving said member in a direction to throw out the clutch, a work support, means for retaining the work support in raised position, and means for rendering said retaining means inoperative on the work support substantially simultaneously with the throwing out of the clutch so as to lower the work support when the machine is stopped.

3. In a machine of the class described, in combination, a work support, clutch mechanism comprising a power-operated member, means for retaining the work support in raised position, and a latch operable by the power-operated member for releasing the work support retaining means.

4. In a machine of the class described, in combination, clutch mechanism comprising a movable clutch member and means operated at a predetermined point in the cycle of operation of the machine for positively moving the clutch member in a direction to throw out the clutch, a work support, connections between the clutch mechanism and the work support for maintaining the work support in raised position, and means operable on said connections to permit the work support to be lowered substantially simultaneously with the throwing out of the clutch.

5. In a machine of the class described, in combination, clutch mechanism comprising a movable clutch member, and means operated at a predetermined point in the cycle of operation of the machine for positively moving the clutch member in a direction to throw out the clutch, a work support, and means for synchronizing the operations of the clutch mechanism and the work support so as to cause the work support to be raised and lowered substantially simultaneously with the throwing in and out of the clutch respectively.

6. In a machine of the class described, in combination, power-operated clutch mechanism, a work support, connections between the work support and clutch mechanism for retaining the work support in raised position, and a latch operated by said clutch mechanism for releasing the work support retaining means when the clutch is thrown out to permit the work support to be lowered when the machine is stopped.

7. In a machine of the class described, in combination, a work support, a clutch comprising a movable clutch member, means for moving said clutch member, means for controlling the movement of said member by said moving means, and means carried by the controlling means for retaining the work support in raised position.

8. In a machine of the class described, in combination, a work support, a clutch comprising a movable clutch member, means for moving said clutch member, said means being normally disconnected from said member, clutch controlling means movable to a position to connect said moving means operatively with said clutch member, and means carried by said clutch controlling means for retaining the work support in raised position.

9. In a machine of the class described, in combination, a drive shaft for the machine, a work support, a clutch, clutch controlling means, connections between the clutch controlling means and the work support comprising a shouldered member operatively connected to the work support, a latch member carried by the clutch controlling means for locking engagement with said shouldered member to retain the work support in raised position, and a latch operable by said drive shaft for releasing said latch member from engagement with the shouldered member to permit lowering of the work support.

10. In a machine of the class described, in combination, a work support, clutch mechanism, connections between the clutch mechanism and the work support comprising a shouldered member operatively connected to the work support, a latch member carried by the clutch mechanism for locking engagement with said shouldered member to retain the work support in raised position, and means operated by the clutch mechanism for releasing said latch member from engagement with said shouldered member to permit lowering of the work support.

11. In a machine of the class described, in combination, a work support, clutch mechanism, connections between the work support and clutch mechanism constructed to cause said clutch mechanism to become operative upon movement of said connections in one direction to throw out the clutch at a predetermined time in the cycle of operations of the machine, means connected with the clutch mechanism for retaining the work support in raised position, and separate means connected with the clutch mechanism for releasing the work support from the control of said retaining means.

12. In a machine of the class described, clutch mechanism constructed to stop the machine at a predetermined point in the cycle of operations of the machine and comprising clutch controlling means movable substantially at any time in the cycle of operations of the machine to a position to render the clutch mechanism operative to stop the machine without further movement of the controlling means, a work support, connections between said clutch controlling means and work support constructed to maintain the work support in raised position subsequent to the movement of the clutch controlling means to said position, and means for breaking said connections upon operation of the clutch mechanism to stop the machine to permit lowering of the work support.

13. In a machine of the class described, clutch mechanism constructed to stop the machine at a predetermined point in the cycle of operations of the machine and comprising clutch controlling means movable substantially at any time in the cycle of operations of the machine to a position to render the clutch mechanism operative to stop the machine without further movement of the controlling means, a work support, connections between said clutch controlling means and work support constructed to maintain the work support in raised position subsequent to the movement of the clutch controlling means to said position, and power-operated means for breaking the connections between the clutch controlling means and the work support to permit lowering of the work support.

14. In a machine of the class described, in combination, a work support, clutch mechanism, connections between the clutch mechanism and the work support operable when moved in one direction to raise the work support and throw in the clutch and when moved in the other direction to cause the clutch to be thrown out positively at a predetermined point in the cycle of operations of the machine and to lower the work support, means for permitting limited movement of the connections in a direction to effect lowering of the work support, said connections being constructed and arranged so as not to lower the work support upon movement of the connections permitted by such limiting means, and means connected with the clutch mechanism for rendering said limiting means inoperative on the work support thereby to permit movement of said connections to lower the work support.

15. In a machine of the class described, in combination, a work support, clutch mechanism comprising movable clutch controlling means, work support controlling means, means for locking said work support controlling means to said clutch controlling means, means for limiting the movement of the clutch controlling means to a position such as to cause the clutch to be thrown out at a predetermined point in the operation of the machine, and means operated by the clutch mechanism subsequent to the movement of the clutch controlling means for unlocking the work support controlling means from the clutch controlling means to permit the work support to be lowered.

16. In a machine of the class described, in combination, a work support, a clutch, work support controlling means, clutch controlling means, a latch member for locking said work support controlling means to said clutch controlling means, means for limiting the movement of the clutch controlling means to a position such as to cause the clutch to be thrown out at a predetermined point in the cycle of operations of the machine, and means for withdrawing said latch member from locking engagement with the work support controlling means subsequent to the movement of the clutch controlling means to permit the work support to be lowered.

17. In a machine of the class described, in combination, a work support, clutch mechanism comprising a movable clutch member, work support controlling means, means for controlling said clutch mechanism, means for locking said work support controlling means to said clutch controlling means, and means operated by said clutch mechanism for releasing said work support controlling means from said clutch controlling means.

18. In a machine of the class described, in combination, a work support, a clutch comprising a movable clutch member, work support controlling means, clutch controlling means, means for operating said clutch member at a predetermined time in the cycle of operations of the machine to stop the machine, means for locking said work support controlling means to said clutch controlling means, and means operated by said clutch member operating means for releasing said work support controlling means from said clutch controlling means.

19. In a machine of the class described, in combination, a work support, a clutch comprising a movable clutch member, work support controlling means, clutch controlling means, means for operating said clutch member, means for locking said work support controlling means to said clutch controlling means comprising a latch member journaled in the clutch controlling means, and means operated by the clutch member operating means for releasing said latch member.

20. In a machine of the class described, in combination, a work support, a clutch comprising a movable clutch member, work support controlling means, clutch controlling means, means for operating said clutch member, means for locking said work support controlling means to said clutch controlling means comprising a latch member journaled in the clutch controlling means and having a shouldered member secured thereto for movement therewith, and a member operable by said clutch member operating means and constructed to engage said shouldered member for releasing said latch member.

21. In a machine of the class described, in combination, a work support, a clutch comprising a movable clutch member, a lever for operating the clutch member, clutch controlling means for operatively connecting said lever with said clutch member, work support controlling means, means for locking said clutch controlling means to said work support controlling means, and means connected with said lever for releasing the work support controlling means from said clutch controlling means concurrently with the throwing out of the clutch by operation of said clutch member.

22. In a machine of the class described, a work support, work support controlling means, clutch mechanism, means for connecting said work support controlling means and said clutch mechanism, a member for rendering said connecting means normally inoperative, operator-controlled means for moving said work support controlling means in a direction to throw in the clutch mechanism and raise the work support, and means for limiting the movement of said member so that such movement of the work support controlling means carries said connecting means out of engagement with said member thereby permitting said connecting means to become operative.

23. In a machine of the class described, in combination, a work support, a clutch comprising a movable clutch member, work support controlling means, clutch controlling means, means for operating said clutch member, means for locking said work support controlling means to said clutch controlling means, a member operatively connected to said clutch member operating means for releasing said work support controlling means from said clutch controlling means, operator-controlled means for raising the work support and causing said clutch member to be thrown in by operation of the clutch mechanism, and means for limiting the movement of said member thereby to permit said locking means to become operative to join said work support controlling means to said clutch controlling means.

24. In a machine of the class described, a work support, work support controlling means, clutch mechanism, means for connecting said work support controlling means and said clutch mechanism, a member normally interposed in the path of movement of said connecting means upon movement of the work support controlling means in a direction to lower the work support and throw out the clutch, yielding means for operating said member in one direction to engage with said connecting means, and power operated means for moving said member in the opposite direction to disconnect said work support controlling means from said clutch mechanism.

25. In a machine of the class described, a work support, work support controlling means, clutch mechanism, means for connecting said work support controlling means and said clutch mechanism, a member normally interposed in the path of movement of said connecting means upon movement of the work support controlling means in a direction to lower the work support and throw out the clutch, means for limiting the movement of said work support controlling means to an extent sufficient to cause the clutch to be thrown out and to bring said connecting means into operative relation with said member but insufficient to lower the work support, and means for operating said member to disconnect said work support controlling means from said clutch mechanism to permit lowering of the work support.

26. In a machine of the class described, in combination, a work support, a clutch comprising a movable clutch member, a lever for operating the clutch member, clutch controlling means for operatively connecting said lever with said clutch member, work support controlling means, means for locking said clutch controlling means to said work support controlling means, a latch member operatively connected with said lever and constructed normally to render said locking means inoperative, common manually controlled means for operating said work support controlling means and said clutch controlling means to raise the work support and throw in the clutch, means for limiting the upward movement of said latch member to a point such that operation of said manually controlled means carries said locking means out of engagement with the latch member, so as to permit said locking means to become operative, means for limiting the movement of the clutch controlling means and work support controlling means in the opposite direction to a point such as to cause the clutch controlling means operatively to connect said lever with the clutch member to throw out the clutch but to maintain the work support in raised position, means for moving said lever in a direction to engage the latch member with the locking means, and means for operating said lever at a predetermined point in the cycle of operations of the machine to throw out the clutch and to release said locking means to permit lowering of the work support.

27. In a machine of the class described, a work support, mechanism for raising and lowering the work support, means for limiting the movement of said mechanism in a direction to lower the work support, a lost motion connection between said mechanism and the work support so constructed that the movement of said mechanism to the extent permitted by the limiting means does not lower the work support, and means for throwing said limiting means out of operation at a predetermined time in the cycle of operations of the machine to effect lowering of the work support.

28. In a machine of the class described, a work support, work support controlling means, means for retaining the work support in raised position comprising a movable member, means for locking the work support controlling means to said movable member, means for limiting the movement of said movable member in a direction to lower the work support, a lost motion connection between said work support controlling means and said work support constructed to prevent lowering of the work support upon movement of said controlling means permitted by said limiting means, and means for releasing the work support controlling means from said movable member to permit the work support to be lowered.

29. In a machine of the class described, a work support, work support controlling means, means for retaining the work support in raised position comprising a movable member, means for locking the work support controlling means to said movable member, means for limiting the movement of said movable member in a direction to lower the work support, a lost motion connection between said work support controlling means and said work support constructed to prevent lowering of the work support upon movement of said controlling means, a member constructed and arranged for engagement with said locking means upon movement of said movable member to the position determined by said limiting means, and means for operating said engaging member to release the work support controlling means from said movable member to permit the work support to be lowered.

30. In a machine of the class described, a work support, work support controlling means, means for retaining the work support in raised position comprising a movable member, means for locking the work support controlling means to said movable member comprising a shouldered member connected to the work support controlling means and a latch member carried by said movable member, means for limiting the movement of said movable member in a direction to lower the work support, a lost motion connection between said work support controlling means and said work support constructed to prevent lowering of the work support upon movement of said controlling means, a member constructed and arranged for engagement with said latch member upon movement of the latch member permitted by said limiting means, and power-operated means for operating said member to release said work support controlling means from said movable member.

31. In a machine of the class described, a drive shaft for the machine, clutch mechanism for governing the operation of said shaft, a work support, connections between the clutch mechanism and the support for maintaining the work support in raised position, and means operated by said shaft in timed relation with said operating mechanism for breaking said connections to cause the work support to be lowered.

32. In a machine of the class described, in combination, a drive shaft for the machine, clutch mechanism for governing the operation of the shaft comprising a movable clutch member, means separate from the shaft and operated by the shaft in timed relation with the operating mechanism for moving the clutch member to throw out the clutch, a work support, connections between the clutch mechanism and the work support, and means operable on said connections to permit the work support to be lowered immediately after the throwing out of the clutch.

33. In a machine of the class described, in combination, clutch mechanism, means for controlling the clutch mechanism, a work support, connections between said controlling means and the work support, and means separate from the clutch controlling means and operated by the power of the machine for breaking said connections to permit lowering of the work support.

34. In a machine of the class described, in combination, clutch mechanism, means for controlling the clutch mechanism, a work support, connections between said controlling means and the work support, and means separate from the controlling means and operated by the power of the machine for breaking said connections to permit the work support to be lowered, said controlling means and said breaking means being constructed and arranged to render the breaking means operative by movement of the controlling means.

35. In a machine of the class described, clutch mechanism comprising a power-driven member constructed to stop the machine at a predetermined point in the cycle of operations of the machine and clutch controlling means operable at any time in the cycle of operations of the machine to cause the power driven member to stop the machine at such predetermined point, a work support, connections between said clutch controlling means and work support constructed to maintain the work support in raised position subsequent to the operation of the clutch controlling means, and means for breaking said connections upon operation of the power driven member to stop the machine.

36. In a machine of the class described, clutch mechanism operable to stop the machine at a predetermined point in the cycle of operations of the machine and comprising clutch controlling means movable substantially at any time in the cycle of operations of the machine, means for limiting the movement of the clutch controlling means to a position such as to cause the clutch to be thrown out, a work support, connections between said clutch controlling means and work support constructed to maintain the work support in raised position subsequent to the movement of the controlling means determined by said limiting means, and means for breaking said connections upon operation of the clutch mechanism to stop the machine, thereby permitting the work support to be lowered.

In testimony whereof I have signed my name to this specification.

FRED L. MACKENZIE.